3,247,291
GRAFT POLYMERS AND A PROCESS FOR MAKING THEM

Karl-Heinz Kahrs, Johan Wolfgang Zimmermann, and Michael Lederer, all of Frankfurt am Main, Germany, assignors to Farbwerke Hoechst Aktiengesellschaft vormals Meister Lucius & Bruning, Frankfurt am Main, Germany, a corporation of Germany
No Drawing. Filed June 15, 1961, Ser. No. 117,284
Claims priority, application Germany, June 18, 1960, F 31,458
15 Claims. (Cl. 260—899)

The present invention relates to graft polymers and to a process for making them.

It has already been proposed to prepare graft polymers by dissolving a polyalkylene glycol and/or an appropriate derivative thereof in a vinylester or a mixture of two or more vinylesters with or without a further solvent and polymerizing the solution so obtained with the addition of a free radical-liberating polymerization initiator.

In this manner, modified polyvinyl acetate is obtained which can be used in wide fields of application.

We have now found that also halogen-containing monomers of the general formula $$CH_2=CXCl$$

wherein X represents hydrogen or chlorine, can advantageously be grafted on to 1,2-epoxy-hydrocarbon polymers.

Graft polymers having very interesting technological properties are obtained by polymerizing these halogen-containing monomers alone, or in admixture with one another, in the presence of 1,2-epoxy-hydrocarbon polymers, if desired in the presence of an organic solvent, with the substantial exclusion of water and under the action of a free radical polymerization catalyst.

These halogen-containing monomers can be used alone or in admixture with one another or in admixture with 1 to 20%, calculated on the monomer mixture, of a copolymerizable compound.

The compounds which can be copolymerized with halogen-containing monomers and can be used alone or in admixture with one another include, for example: vinylesters of a saturated monocarboxylic acid having 1 to 4 carbon atoms, for example vinyl acetate, esters of acrylic or methacrylic acid with aliphatic, saturated, monohydric alcohols having 1 to 4 carbon atoms; esters of maleic acid or fumaric acid with aliphatic, saturated, monohydric alcohols having 1 to 4 carbon atoms.

In the process of this invention, the halogen-containing monomer or monomer mixture may be used in the reaction mixture in a proportion of 0.1 to 99% by weight, that is to say the graft polymerization between the starting components—1,2-epoxy - hydrocarbon polymer/halogen-containing monomer—takes place irrespective of the mixing ratio used.

The term "1,2-epoxy-hydrocarbon polymers" as used herein is intended to mean polymers which are composed of units recurring $n$-times and having the formula:

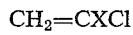

wherein R represents hydrogen or an alkyl radical having 1 to 6 carbon atoms or a mononuclear aryl radical, and $n$ represents a whole number of 5 to 50,000, advantageously 7 to 10,000.

The above 1,2-epoxy-hydrocarbon polymers may be water-soluble or water-insoluble. It is, however, especially advantageous in the process of this invention to use 1,2-epoxy-hydrocarbon polymers which are at least partially soluble in the monomer or monomer mixture at the boiling temperature of the latter.

The above 1,2-epoxy-hydrocarbon polymers are usually prepared by polyaddition of 1,2-epoxy-compounds, for example 1,2-alkylene oxides, such as ethylene oxide or propylene oxide, with compounds carrying 1 to 4 active hydrogen atoms, for example water, monohydric to tetrahydric, aliphatic alcohols, saturated monocarboxylic or dicarboxylic acids, monoamines or diamines, or phenols.

The radicals of these compounds form but one of the terminal groups of the 1,2-epoxy-hydrocarbon polymer. The other terminal group is generally a hydroxyl group which may subsequently be etherified or esterified.

The nature of the terminal groups in the trunk polymer is generally of no importance for the present process since the graft polymerization most likely takes place at the polyether chain.

The trunk polymers which are advantageously used include polyethylene glycols having a molecular weight of 500 to about 4 millions or more especially those having a molecular weight of 1,000 to 50,000; or polypropylene glycols having a molecular weight of 500 to 70,000; polybutylene glycol, polyisobutylene glycol; or still higher homologous polyalkylene glycols or styrene oxide polymers; there may also be used products which are obtained by copolymerization or terpolymerization of ethylene oxide, propylene oxide, 1,2-epoxy-butane, 1,2-isobutylene oxide or still higher 1,2-alkylene oxides, products which may also contain incorporated chloroprene oxide.

As appropriate starting materials there may also be used segment polymers, such as hydroxyethylated polypropylene glycol containing a polypropylene glycol as middle portion on to the two terminal hydroxyl groups of which are polymerized several mols of ethylene oxide; hydroxyethylated polybutylene glycol in which ethylene oxide is polymerized on to the polybutylene glycol middle portion, or products which are obtained by hydroxyethylation of a polymer composed of butylene oxide and propylene oxide. These statements apply in analogous manner to products obtained from higher homologous alkylene oxides.

In the graft polymerization of this invention there may also be used derivatives of the above polyalkylene glycols the terminal hydroxyl groups of which are etherified, esterified or aminated on one or both sides with monofunctional or polyfunctional compounds, for example the following compound:

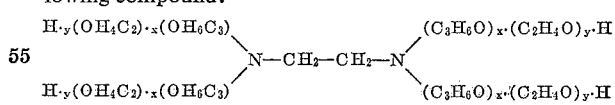

$x$: about 15, $y$: about 50.

All these 1,2-epoxy-hydrocarbon polymers may be used alone or in admixture with one another as trunk polymer.

The solvents in which the graft polymerization may be carried out, if desired, must be capable of dissolving at least partially the epoxy-hydrocarbon polymer as well as the halogen-containing monomer at the reaction temperature used in a given case. It is not necessary, however, that the resulting graft polymer is maintained in solution.

As solvents suitable for use in the graft polymerization according to this invention there may be mentioned more especially, for example: saturated, aliphatic or cycloaliphatic alcohols having 1 to 6 carbon atoms, aliphatic or cycloaliphatic ketones having 3 to 6 carbon atoms, esters of aliphatic alcohols having 1 to 10 carbon atoms with aliphatic and aromatic monocarboxylic or dicarboxylic acids having 2 to 8 carbon atoms, or saturated, aliphatic or cycloaliphatic ethers having 4 to 6 carbon atoms, for example tetrahydrofurane.

The words "substantial exclusion of water" as used herein mean that the reaction mixture contains a maximum of 5% water, calculated on the reactants and the organic solvent which may be present.

In a preferred embodiment of the invention, the epoxy-hydrocarbon polymer is melted while stirring under the atmosphere of an inert gas, for example nitrogen, or dissolved in the presence of a solvent, and the halogen-containing monomer is gradually added to the melt at the polymerization temperature.

The reaction is started under the influence of a conventional free radical polymerization catalyst, for example diacyl peroxides, such as dibenzoyl peroxide, diacetyl peroxide, di - tert. - butylperoxide or azobisisobutyronitrile or a customary redox system; the polymerization may also be activated by irradiation. The initiator is used in a proportion of 0.1 to 10% by weight, calculated on the reaction mixture. The initiator is advantageously homogeneously mixed with the epoxy-hydrocarbon polymer or its solution, but it may also be dissolved in the monomer before the reaction.

The reaction is carried out at a temperature between about 20 and 120° C., preferably 40 and 90° C.

The above statements show that the graft polymerization according to this invention can be carried out either in the homogeneous phase by block polymerization or solution polymerization, or partially in the heterogeneous phase by precipitating polymerization.

The graft polymer is obtained on the form of a colorless block, soft resin or, when the graft polymerization has been carried out in the presence of a solvent, as viscous solution or powder.

In most cases, the products obtained need not be subjected to further processing operations.

The graft polymerization can be demonstrated, for example in the case of vinyl chloride grafted on to polyethylene glycol, by the following scheme of formulae:

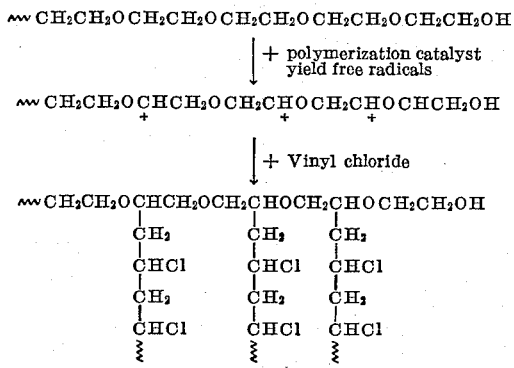

It can readily be proved that graft polymerization has occurred by determination of the hydroxyethyl and chlorine contents for example in the case of water-insoluble products with a higher chlorine content after extraction of the finely ground crude product with water or methanol, or after repeated reprecipitation of a solution of the graft polymer, for example from tetrahydrofurane in water or methanol.

When the 1,2-epoxy-hydrocarbon polymers and the halogen-containing monomers are used in a ratio such that the resulting graft polymer is at the limit between water-solubility and water-insolubility, disintegration of the aqueous solution into its components is observed on heating the solution to a certain temperature, termed turbidity point. This fact offers a further possibility for purifying the graft polymers. They are first dissolved in cold water, the resulting solution is heated to precipitate the graft polymers which are separated, and the degree of grafting is determined by analysis.

The properties of the novel graft polymers obtained by the process of this invention may vary within wide limits depending on the ratio in which the individual reacting components are used and on the type and molecular weight of the 1,2-epoxy-hydrocarbon polymer used as the trunk polymer.

It can generally be said that graft polymers containing a small proportion of 1,2-epoxy-hydrocarbon polymer as trunk polymer behave like modified halogen-containing homopolymers, for example like modified polyvinyl chloride, and that, inversely, graft polymers containing a predominant proportion of 1,2-epoxy-hydrocarbon polymers resemble more and more the trunk polymer.

The graft polymerization according to this invention offers the advantage to produce a novel macromolecular compound from two absolutely different components, which cannot be obtained by customary copolymerization of the corresponding monomers, for example vinyl chloride with ethylene oxide.

The products obtained by this invention can be used in wide fields of application, distinction being advantageously made between the water-soluble types containing a relatively small proportion of incorporated halogen-containing monomers and the water-insoluble types containing a great proportion of incorporated halogen-containing monomers.

The water-soluble types can be used with advantage as textile auxiliary agents, emulsifiers, protective colloids, thickening agents, heat sensibilizers for latices, adhesives and additives to adhesives.

The water-insoluble types can be used for the preparation of impact resistant, antistatic shapes, gasoline-proof packing material or cements.

The following examples serve to illustrate the invention, but they are not intended to limit it thereto, the parts being by weight unless otherwise stated:

*Example 1*

In a glass bottle provided with a reflux condenser, a dropping funnel and a heating bath 100 parts of an hydroxyethylated polypropylene oxide (molecular weight: 4,500; hydroxyethyl content: about 75%)

were heated to about 60° C. and thereby melted.

The molten hydroxyethylated polypropylene oxide was then rapidly admixed with the following solution:

100 parts vinylidene chloride containing in the dissolved state, 3.5 parts of an about 25% solution of diacetyl peroxide in dibutyl phthalate.

The heating bath was so adjusted that vivid reflux set in. After 7 hours, the monomer in excess was removed by application of a vacuum. The graft polymer was removed from the bottle, poured on to a filter and washed well with warm water until a filter sample no longer involved precipitation when treated with an aqueous potassium-bismuth-iodide solution as reagent on free polyalkylene glycol. The product was then dried at 20° C. and under a pressure of 30 mm. of mercury until its weight remained constant.

45 parts of a granular, yellowish graft polymer were obtained. Before analysis, the product was extracted for 48 hours with methanol.

Chlorine content: 59.8%

Pure polyvinylidene chloride had a chlorine content of 73.2%.

Example 2

The procedure was the same as in Example 1, but 100 parts polyethylene glycol (molecular weight: 4,000) were used instead of hydroxyethylated polypropylene oxide.

75 parts of a granular product having the following analytical data, determined after 48 hours' extraction with methanol, were obtained:

|  | Percent |
|---|---|
| Chlorine content | 60.1 |
| Oxethyl content | 19.4 |

The product obtained was soluble in hot dimethyl formamide.

Example 3

The procedure was the same as in Example 1, but 100 parts polypropylene glycol (molecular weight: 2,000) were used instead of hydroxyethylated polypropylene oxide.

16 parts of a granular product having the following analytical data, determined after extraction with methanol, were obtained:

|  | Percent |
|---|---|
| Chlorine content | 64.2 |
| Oxygen content | 3.9 |

The product obtained was soluble in the following solvents: benzene, dioxane, cyclohexanone.

Example 4

In a bomb tube 200 parts vinyl chloride 20 parts polyethylene glycol (molecular weight: 25,000) and 2 parts dibenzoyl peroxide were melted.

The resulting mixture was treated for 7 hours at 48° C. on a shaking machine.

The polyethylene glycol dissolved in the vinyl chloride. After polymerization, a white block which was dissolved in tetra-hydrofurane and precipitated with water was obtained. The precipitation was repeated twice to remove unreacted polyethylene glycol.

The graft polymer so obtained contained 6% oxethyl groups, determined by the Morgan test (cf. P. W. Morgan, Ind. Eng. Chem. 18 (1946), page 500 and 53.6% chlorine.

Example 5

In an autoclave provided with a stirrer, 1,500 parts polyethylene glycol (molecular weight: 25,000) and 1.5 parts dibenzoyl peroxide were melted at 70° C., and 1,070 parts vinyl chloride containing 9 parts dissolved dibenzoyl peroxide were added slowly while stirring. The pressure was about 9 atmospheres (gauge). After 4.5 hours, 2,000 parts of a waxy polymer were obtained. The polymer contained 14% chlorine after double reprecipitation from tetrahydrofurane with water.

Example 6

In the manner disclosed in Example 5

2,000 parts polyethylene glycol (molecular weight: 25,000) and 5 parts dibenzoyl peroxide were polymerized with 270 parts vinyl chloride in an autoclave provided with a stirrer.

The vinyl chloride was added in dosages so that the internal pressure did not exceed 5 atmospheres (gage).

After 2 hours, 2,100 parts of a waxy polymer containing 1.6% chlorine were obtained.

The product obtained was soluble in cold water but the solution disintegrated on being heated.

We claim:

1. A process for the manufacture of chlorine-containing graft polymers, wherein at least one chlorine-containing monomer of the general formula $CH_2=CXCl$, in which X represents a member selected from the group consisting of hydrogen and chlorine, and 1 to 20% by weight, calculated on the total monomers, of at least one other monomer selected from the group consisting of vinylesters of a saturated monocarboxylic acid having 1 to 4 carbon atoms, esters of acrylic and methacrylic acid with aliphatic, saturated, monohydric alcohols having 1 to 4 carbon atoms, and esters of maleic and fumaric acid with aliphatic, saturated, monohydric alcohols having 1 to 4 carbon atoms, are graft-polymerized on to at least one 1,2-epoxy-hydrocarbon polymer as the trunk polymer, which is formed by $n$-recurring units of the formula

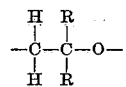

in which R represents a member selected from the group consisting of hydrogen, an alkyl radical having 1 to 6 carbon atoms and a phenyl radical, and $n$ is a whole number of 5 to 50,000, the graft polymerization being carried out under the influence of a free radical polymerization catalyst while using the monomers and the trunk polymers in a ratio of 99:1 to 1:99 parts by weight.

2. A process for the manufacture of chlorine-containing graft polymers, wherein at least one chlorine-containing monomer of the general formula $CH_2=CXCl$, in which X represents a member selected from the group consisting of hydrogen and chlorine, is graft-polymerized on to at least one 1,2-epoxy-hydrocarbon polymer as the trunk polymer, which is formed by $n$-recurring units of the formula

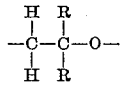

in which R represents a member selected from the group consisting of hydrogen, an alkyl radical having 1 to 6 carbon atoms and a phenyl radical, and $n$ is a whole number of 5 to 50,000, the graft polymerization being carried out under the influence of a free radical polymerization catalyst while using the monomers and the trunk polymers in a ratio of 99:1 to 1:99 parts by weight.

3. The process of claim 1, wherein the graft-polymerization is carried out in the presence of at least one organic solvent selected from the group consisting of, aliphatic and cycloaliphatic alcohols having 1 to 6 carbon atoms, aliphatic and cycloaliphatic ketones having 3 to 6 carbon atoms, esters of aliphatic alcohols having 1 to 10 carbon atoms with aliphatic and aromatic monocarboxylic and dicarboxylic acids having 2 to 8 carbon atoms, and saturated, aliphatic and cycloaliphatic ethers having 4 to 6 carbon atoms.

4. The process of claim 1, wherein vinyl chloride is used as chlorine-containing monomer.

5. The process of claim 1, wherein vinylidene chloride is used as chlorine-containing monomer.

6. The process of claim 1, wherein a polyethylene glycol having a molecular weight within the range of 500 to 4,000,000 is used as 1,2-epoxy-hydrocarbon polymer.

7. The process of claim 1, wherein a polyethylene glycol having a molecular weight within the range of 1,000 to 50,000 is used as 1,2-epoxy-hydrocarbon polymer.

8. The process of claim 1, wherein a polypropylene-glycol having a molecular weight of 500 to 10,000 is used as 1,2-epoxy-hydrocarbon polymer.

9. The process of claim 1, wherein polyhydroxyethylated polypropylene glycol is used as 1,2-epoxy-hydrocarbon polymer.

10. Chlorine-containing graft polymers consisting essentially of 99 to 1% by weight of at least one 1,2-epoxyhydrocarbon polymer as the trunk polymer, which is formed by n-recurring units of the formula

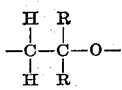

in which R represents a member selected from the group consisting of hydrogen, an alkyl radical having 1 to 6 carbon atoms and a phenyl radical, and $n$ represents a whole number of 5 to 50,000, and of 1 to 99% by weight of a mixture of monomers grafted on to said trunk polymer, said mixture of monomers consisting of at least one chlorine-containing monomer of the formula $$CH_2=CXCl$$

in which X represents a member selected from the group consisting of hydrogen and chlorine, and 1 to 20% by weight, calculated on the monomeric mixture, of at least one other monomer selected from the group consisting of vinylesters of a saturated monocarboxylic acid having 1 to 4 carbon atoms, esters of acrylic and methacrylic acid with aliphatic, saturated, monohydric alcohols having 1 to 4 carbon atoms, and esters of maleic and fumaric acid with aliphatic, saturated, monohydric alcohols having 1 to 4 carbon atoms.

11. Chlorine-containing graft polymers consisting essentially of 99 to 1% by weight of at least one 1,2-epoxyhydrocarbon polymer as the trunk polymer, which is formed by n-recurring units of the formula

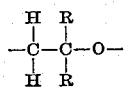

in which R represents a member selected from the group consisting of hydrogen, an alkyl radical having 1 to 6 carbon atoms and a phenyl radical, and $n$ represents a whole number of 5 to 50,000, and 1 to 99% by weight of at least one chlorine-containing monomer of the formula $CH_2=CXCl$, in which X represents a member selected from the group consisting of hydrogen and chlorine, said chlorine-containing monomer being grafted on to the trunk polymer.

12. Chlorine-containing graft polymers as claimed in claim 11, wherein the trunk polymer is a polyethylene glycol having a molecular weight within the range of 1,000 and 50,000.

13. Chlorine-containing graft polymers as claimed in claim 11, wherein the trunk polymer is a polyhydroxyethylated polypropylene glycol.

14. Chlorine-containing graft polymers as claimed in claim 11, wherein vinyl chloride units are grafted on to the trunk polymer.

15. Chlorine-containing graft polymers as claimed in claim 11, wherein vinylidene chloride units are grafted on to the trunk polymer.

References Cited by the Examiner
UNITED STATES PATENTS 2,840,447 6/1958 Green _____ 260—29.6
2,840,549 6/1958 McNulty et al. _____ 260—92.8

SAMUEL H. BLECH, *Primary Examiner.*

DAVID E. PELHAM, *Examiner.*